United States Patent [19]

Raymond et al.

[11] Patent Number: 4,811,823
[45] Date of Patent: Mar. 14, 1989

[54] MAGNETIC PARTICLE CLUTCH

[75] Inventors: Bruce C. Raymond, Pittsboro; Richard A. Fink, Rougemont, both of N.C.

[73] Assignee: Honeywell Inc., Minneapolis, Minn.

[21] Appl. No.: 125,892

[22] Filed: Nov. 27, 1987

[51] Int. Cl.$^4$ .............................................. F16D 37/02
[52] U.S. Cl. .................................... 192/21.5; 188/267
[58] Field of Search ........................... 192/21.5, 84 E; 188/267, 161

[56] References Cited

U.S. PATENT DOCUMENTS

| | | | |
|---|---|---|---|
| 2,605,876 | 8/1952 | Becker | 192/21.5 |
| 2,840,206 | 6/1958 | Logan | 192/21.5 |
| 2,886,151 | 5/1959 | Winslow | 192/21.5 |
| 2,897,931 | 8/1959 | Didszuns | 192/21.5 |
| 2,921,657 | 1/1960 | Winther | 192/21.5 |
| 3,094,202 | 6/1963 | Issler | 192/21.5 X |

Primary Examiner—Rodney H. Bonck
Attorney, Agent, or Firm—Howard Paul Terry

[57] ABSTRACT

A magnetic particle clutch is provided for use as a clutch or brake. The clutch is particularly useful in a helicopter steering subassembly. The clutch has an inner rotor and an outer drum with a common axis. The inner rotor has a shaft on which the outer drum is journaled. Between the inner rotor and the outer drum is a cylindrical working cavity, which contains magnetic powder. The outer drum has a peripheral coil and has exterior slip rings for actuating the coil. Axial flux lines caused by the actuated coil pass through the magnetic powder, causing a chain-like linking of particles of powder, which results in a shear force and torque between outer drum and inner rotor. In order to prevent shifting of the powder within the cylindrical cavity during tilting of the clutch, a series of conical and radial cavities are disposed at each end of the cylindrical cavity and connecting thereto. The conical and radial cavities at each end act like powder guides. Centrifugal force on the powder at clutch start-up distributes evenly the powder peripherally and axially along cylindrical cavity. Gravity forces on the powder during angular displacements of the clutch in a helicopter during flight do not easily displace the powder out of the cylindrical cavity. The clutch torque is proportional to coil current and is independent of clutch speed.

3 Claims, 4 Drawing Sheets

MAGNETIC PARTICLE CLUTCH

The invention relates to a magnetic particle clutch; and in particular the invention relates to a magnetic particle clutch having an axial cylindrical cavity for the magnetic particles and having coils with slip ring conductors.

BACKGROUND OF THE INVENTION

A prior art magnetic particle clutch, which has an axial cylindrical cavity, is described in the publication, entitled "Principles of Operation of Magneclutches and Magnebrakes," published by Sperry Flight Systems, dated November 1984, and is described hereafter.

A second prior magnetic particle clutch which has coils with slip ring conductors, and which has two radial cavities, is a modification of an existing design of the assignee, and is described hereafter.

The first prior art clutch includes an outer drive drum which has an axis and which has a radially inner surface, a coaxial inner driven drum which has a radially outer surface forming a cylindrical cavity with the radially inner surface and which is rotatable relative to the outer drive drum, magnetic particles disposed in the cylindrical cavity, and a coil unit for energizing the metal particles in the cavity.

The second prior art clutch includes an outer drive rotor which has an axis and which has a radially inner surface with an annular slot, a coaxial inner driven rotor which has an annular disk that is received in the annular slot forming a first annular radial cavity and a second annular radial cavity, magnetic particles disposed in the first radial cavity and the second radial cavity, a first set of coils and a second set of coils respectively energizing the magnetic particles in the first radial cavity and the second radial cavity, and a slip ring conductor which is mounted on the outer drive rotor and which is connected to the coils.

One problem with the first and second prior art clutches is that they are not suitable for use in a device which incorporates a change to the orientation of its axis of rotation during use, such as a helicopter, because the magnetic particles are shifted an excessive amount by the effects of centrifugal force and gravity force during the device start-up and flight.

SUMMARY OF THE INVENTION

According to the present invention, a magnetic particle clutch is provided. This clutch includes an outer drum which has an axis and which has a radially inner surface and which has a first end conical inner surface and which has a first end vertical inner surface, a coaxial inner drum which has a radially outer surface forming with the radially inner surface a cylindrical cavity and which has a first end conical outer surface forming with the first end conical inner surface a first end conical cavity and which has a first end vertical outer surface forming with the first end vertical inner surface a first end radial cavity and which is rotatable relative to the outer drum, magnetic particles disposed in the cylindrical cavity and in the first conical cavity and in the first radial cavity, a set of coils for energizing the magnetic particles in the cylindrical cavity and first conical cavity and in the first radial cavity, and a slip ring conductor which is mounted on the outer drum and which is connected to the set of coils.

By using the structure forming the first end conical cavity and the first end radial cavity, it overcomes the problem of unwanted shifting of the magnetic particles an excessive amount by the effects of centrifugal force and gravity force during device start-up and flight.

The above advantages and subsequent description will be more readily understood by reference to the following drawings.

DESCRIPTION OF THE PREFERRED EMBODIMENTS

In FIGS. 1 through 4, the views of the prior art embodiments are shown.

Figure 5:
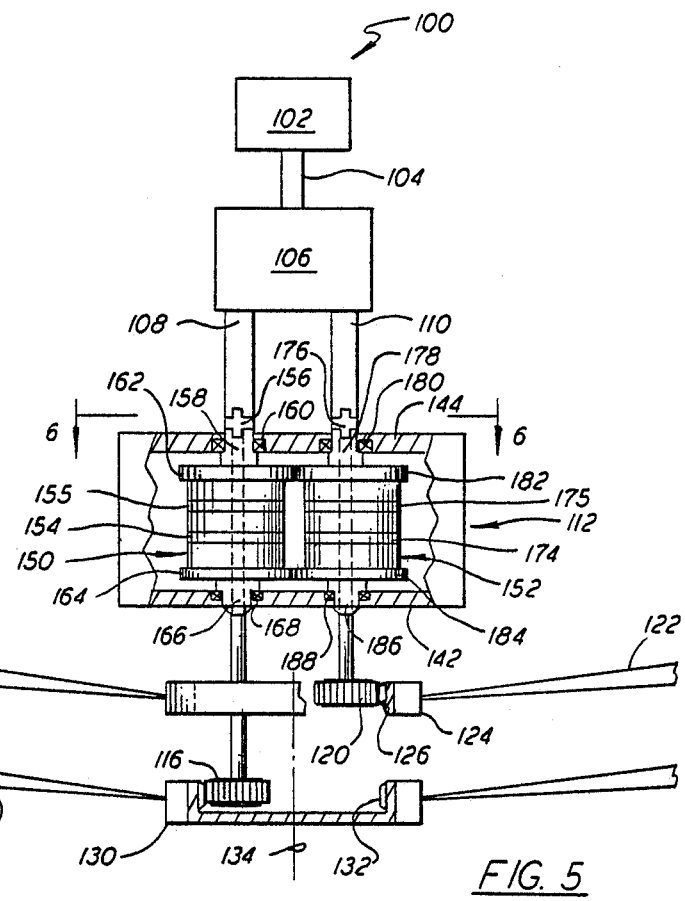
FIG. 5 is a schematic view of a helicopter steering mechanism having magnetic particle clutches according to the invention.
Figure 6:
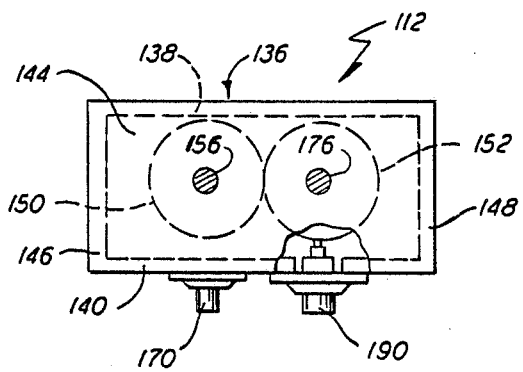
FIG. 6 is a section view as taken along the line 6—6 of FIG. 5.
Figure 7:
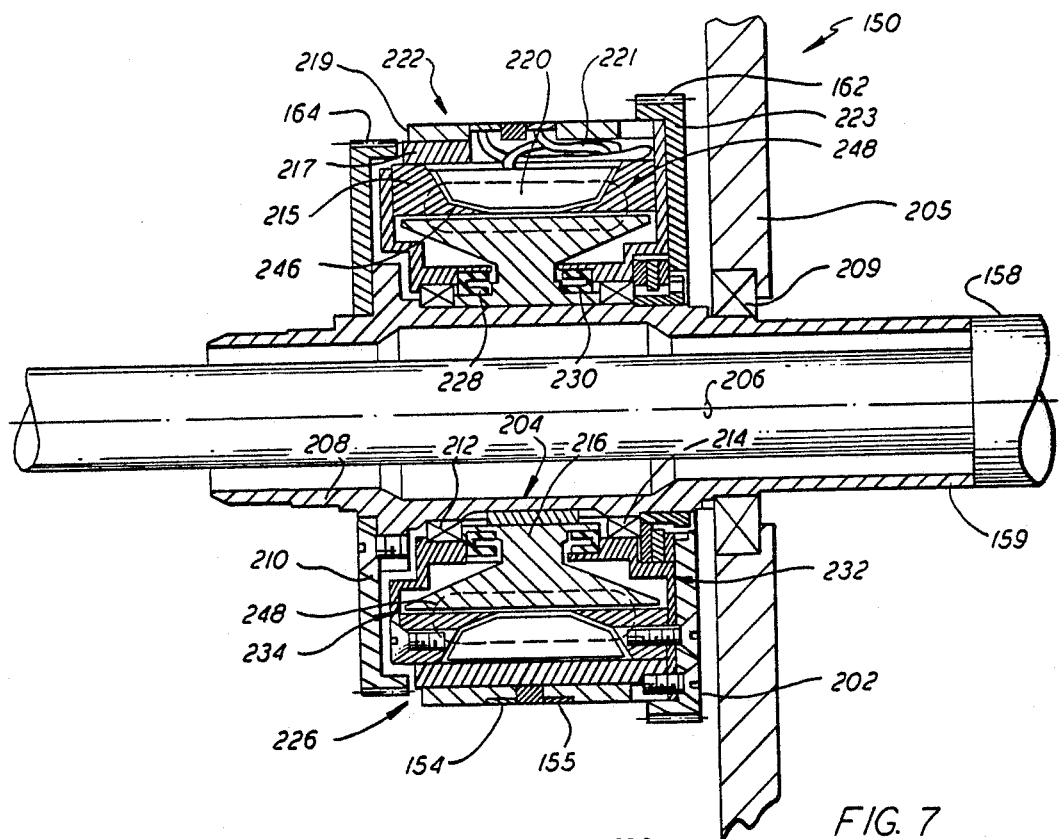
FIG. 7 is a section view of a magnetic particle clutch according invention.

In FIGS. 5 through 7, the views of the preferred embodiments of the invention are shown.

Figure 1:
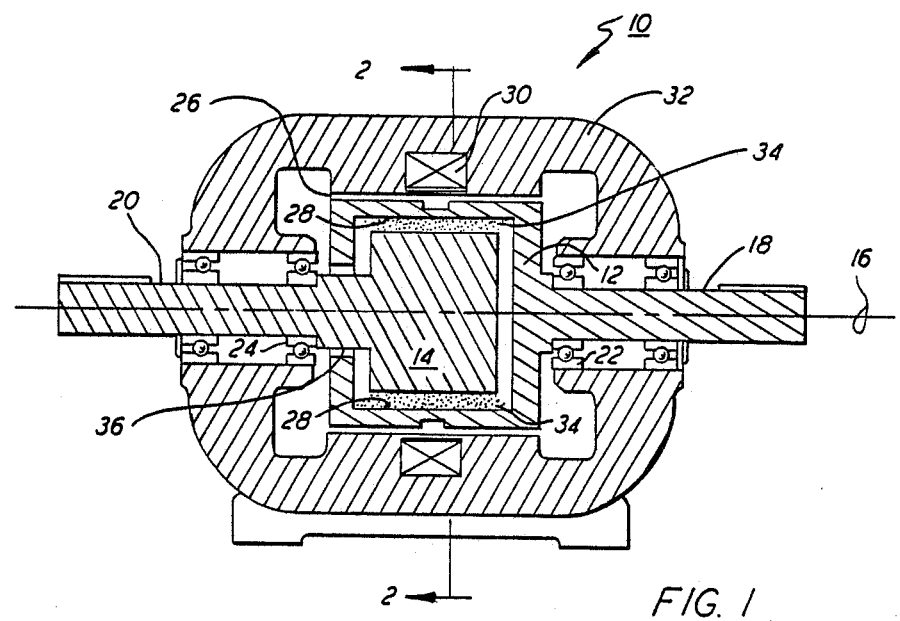
FIG. 1 is a schematic section view of a first prior art magnetic particle clutch.
Figure 2:
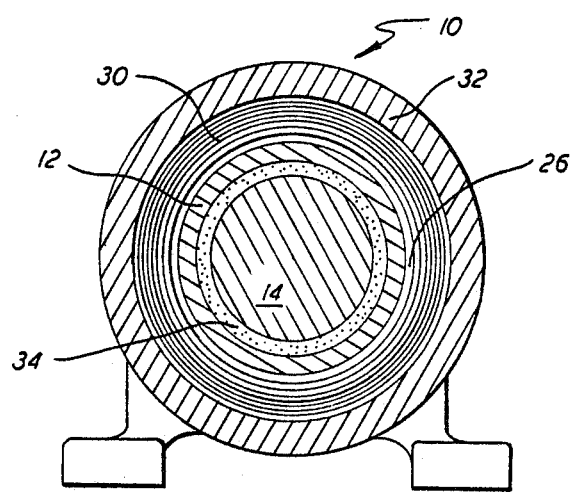
FIG. 2 is a section view as taken along the line 2—2 of FIG. 1.

In FIGS. 1 and 2, a view of the first prior art magnetic particle clutch 10 is shown. Clutch 10 includes an outer, cantilevered, right side, drive rotor or drive drum 12. Clutch 10 also includes an inner, cantilevered, left side, driven rotor or driven drum 14. Drums are coaxial along an axis 16.

Drive drum 12 has a cantilevered, drive shaft 18. Driven drum 14 has a cantilevered driven shaft 20. Drive shaft 18 is supported by a coaxial bearing 22. Driven shaft 20 is supported by coaxial bearing 24. An air gap 26 is provided around drive drum 12 for rotation of drive drum 12 about axis 16 relative to driven drum 14. A cylindrical working gap or cylindrical cavity 28 is provided between drive drum 12 and driven drum 14, which contains a magnetic medium, or particles, or powder 34. A housing 32 is provided, which supports bearings 22, 24, and which supports a coil unit or coil 30. Powder 34 is energized by coil 30 during operation. The shear force of powder 34 depends only on the current in coil 30. A clearance 36 between driven shaft 20 and outer drum 12 is provided so that no load is transferred by outer drum 12 to driven shaft 20.

First prior art clutch 10 is not fully suitable for use in a vertical axis subassembly because powder 34 falls to one end of cavity 28 due to gravity force during tilt of axis 16.

Figure 3:
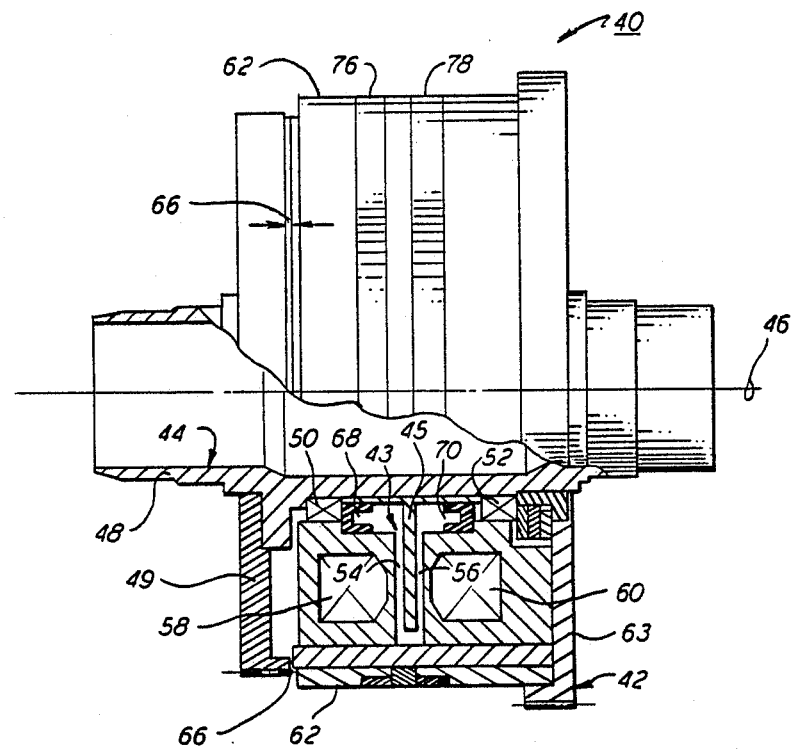
FIG. 3 is an elevation view and a partial section view of a second prior art magnetic particle clutch.
Figure 4:
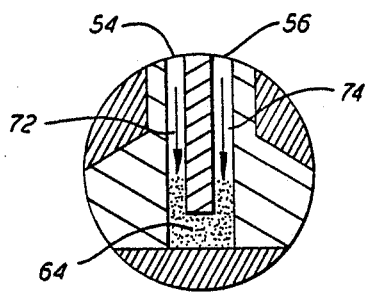
FIG. 4 is an enlarged view of a portion of FIG. 3.

In FIGS. 3 and 4, a view of the second prior art magnetic particle clutch 40 is shown. Clutch 40 includes an outer drive shaft 42, which has a radial slot 43. Clutch 40 also includes an inner driven rotor 44, which has a radial disk 45, that is received in slot 43 forming a first radial cavity 54 and a second radial cavity 56. Drive shaft 42 rotates about an axis 46 relative to driven rotor 44.

Driven rotor 44 has a driven shaft 48 and an end wall 49, which is fixedly connected to driven shaft 48. Drive shaft 42 has a wall 63, and a cylindrical housing 62, which has an axially spaced first coil 58 and second coil 60. Housing 62 also has an axially spaced first bearing 50 and second bearing 52 which are journaled on driven rotor 44. Housing 62 also has an axially spaced first seal 68 and second seal 70.

First radial cavity 54 and second radial cavity 56 contain magnetic powder 64. Drive shaft 42 and driven rotor 44 are separated by a clearance 66 between housing 62 and end wall 49. Wall 49 and wall 63 have exterior gear teeth.

Respective portions of powder 64 in radial cavities 54 and 56 have respective centrifugal forces 72 and 74 acting thereon. Coils 58, 60 are connected to slip rings 76, 78, which are mounted on housing 62. Forces 72, 74 cause powder 64 to pack at the radially outer parts of cavities 54, 56, thereby pinching disk 45 and causing excessively high, friction, which is objectionable.

In FIGS. 5 through 8, a helicopter steering device 100 according to the invention is provided. Steering device 100 includes magnetic particle clutches 150, 152, according to the invention.

In FIG. 5, steering device 100 includes a gas turbine 102, which has a shaft 104, and a differential 106, which has a left drive shaft 108 and a right drive shaft 110. A yaw or steering clutch assembly 112 connects to shafts 108, 110. Shaft 108 extends through left clutch 150 and connects to exterior gear 116. Clutch assembly 112 has a left driven shaft 108, which has a left exterior gear 116, and a right driven shaft 110, which has a right exterior gear 120. Exterior gear 120 is in engagement with interior gear 126.

In FIG. 5, steering device 100 has inner blades 122, which are supported by an inner hub 124, that has a conventional support (not shown). Inner hub 124 has an inner interior gear 126, which engages right exterior gear 120. Steering device 100 also has outer blades 128, which are supported by an outer hub 130, that has a conventional support (not shown). Outer hub 130 has an outer interior gear 132, which engages left exterior gear 116. Hubs 124, 130 are coaxial along axis 134. Blades 122 and 128 rotate in opposite directions about axis 134.

In FIGS. 5 and 6, clutch assembly 112 is shown. Clutch assembly 112 has a casing 136, which includes a top wall 138, a bottom wall 140, a front wall 142, a rear wall 144, a left end wall 146 and a right end wall 148. Clutch assembly 112 also includes a left clutch 150, and a right clutch 152, which are substantially identical in construction.

Left clutch 150 has two slip rings 154, 155; and has a coupling 156, which connects to left drive shaft 108. Coupling 156 connects to a left input shaft 158, which is mounted in a bearing 160 that is supported by rear wall 144. Left input shaft 158 connects to left small (interior) gear 164. Left small gear 164 connects to right large (exterior) gear 184. Left output shaft 166 is mounted in bearing 168 that is supported by front wall 142. Slip rings 154, 155 have a brush assembly 170, as shown in FIG. 6, that is supported by bottom wall 140.

Right clutch 152 has two slip rings 174, 175; and has a coupling 176, which connects to right drive shaft 110. Coupling 176 connects to right input shaft 178, which is mounted in a bearing 180 that is supported by rear wall 144. Right input shaft 178 connects to right small (interior) gear 182. Right small gear 182 connects to left large (exterior) gear 162. Right output shaft 186 is mounted in bearing 188 that is supported by front wall 142. Slip rings 174, 175 have a brush assembly 190, as shown in FIG. 6, that is supported by bottom wall 140.

In FIG. 7, left clutch 150, which is substantially identical in construction to right clutch 152, is shown in detail. Left clutch 150 includes an outer, right side, drum or body 202, and an inner, left side, rotor or body 204. Rotor 204 connected to input shaft 158 by coupling 159. Drum 202 rotates relative to rotor 204 about axis 206 in the same direction.

Rotor 204 includes shaft 208 which is mounted in bearing 209 that is inside wall 205, and a left end wall 210. Rotor 204 also includes first and second bearings 212, 214, which are journaled on shaft 208, and a rotor cylinder 216. A working gap or cylindrical cavity 218 is disposed between rotor 204 and drum 202, and is adjacent to rotor cylinder 216. Rotor cylinder 216 is fixedly connected to shaft 208.

Figure 8:
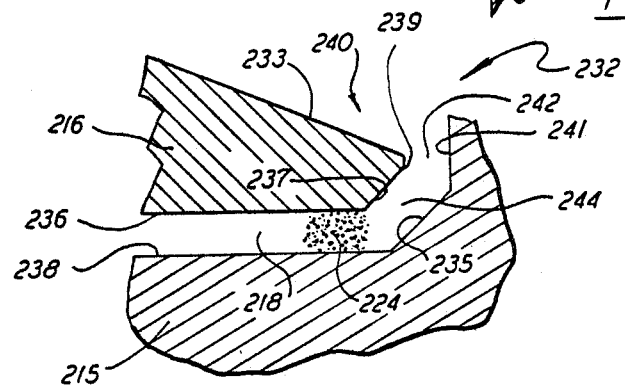
FIG. 8 is an enlarged view of a portion of FIG. 7.

Drum 202 is mounted on first and second bearings 212, 214 for rotation of drum 202 relative to rotor cylinder 216. Drum 202 includes a coil unit or a coil 220, and a housing or coil support 222. Drum 202 also includes right end wall 223. Housing 222 includes a radially inner cylindrical portion 215, an intermediate cylindrical portion 217, and a radially outer cylindrical portion 219, all of which are fixedly connected together in one unit. Inner portion 215 contains coil 220. Intermediate portion 217 contains conductors 221 which extend from coil 220 to slip rings 154, 155. Outer portion 219 contains the slip rings 154, 155. Cylindrical cavity 218 contains magnetic powder 224, as shown in FIG. 8. A clearance 226 is provided between left end wall 210 and housing 222. Seals 228, 230 are provided adjacent to respective bearings 212, 214 in order to contain the powder 224 adjacent to rotor cylinder 216.

In FIG. 8, cylindrical cavity 218, which contains powder 224, has a right powder guide or trap or sinuous passageway 232. Housing inner cylinder portion 215 has a radially inner surface 238. Rotor cylinder 216 has a radially outer surface 236. Surfaces 236 and 238 define the cylindrical cavity 218.

In FIG. 8, the right guide 232 is identical in construction to the left guide 234, but is opposite hand or a mirror image thereof. Right guide 232 includes passages or cavities 240, 242 and 244. Rotor cylinder 216 has a conical outer surface 237. Housing inner cylinder portion 215 has a conical inner surface 235. Conical surfaces 235 and 237 define the passage or first end conical cavity 244. Rotor cylinder 216 has a vertical surface 239. Housing inner cylinder portion 215 has an opposite vertical surface 241. Surfaces 234 and 239 define passage or first end radial cavity 242. Rotor cylinder 216 also has a conical inner surface 233. Surfaces 233 and 241 define passage or first end inner cavity 240. Passages or cavities 240, 242 and 244 which define right guide 232, permit entry of portions of powder 224 from cavity 240 through cavity 242 and cavity 244 to cavity 218; due to centrifugal force thereon, when, axis 206 is in any orientation. Similarly, left guide 234 permits entry at start-up of portions of powder 224 to cavity 218. Right guide 232 and left guide 234 restrain movement of portions of powder 224 from cavity 218 to cavity 240 due to gravity force, particularly when axis 206 is tilted close to a vertical position in flight. At start-up, when axis 206 is horizontal, and also in flight, portions of powder 224 slide down surfaces 233 and 235 into cavity 218 , due to centrifugal force thereon. Surfaces 233, 241 235, 237 and 239 are called lead-in surfaces.

Coil or coil unit 220 has an inner elliptical surface 246 as shown in section view in FIG. 7. Surface 246 partly defines the axial direction of flow of flux lines 248. A single flux line 248, as shown in FIG. 7, represents a plurality of flux lines in section view, and a set of flux lines in a peripheral direction. Flux lines 248 pass through cavity 218 and right powder guide 232 and left powder guide 234, and pass through rotor cylinder 216, and pass through housing inner cylinder portion 215. Powder 224 causes a shear force between outer drum 202 and inner rotor 204 when energized by flux lines 248. The shear force amount is proportional to the coil current. The centrifugal force restrains powder 224 in cavity 218 after start up, when axis 206 is tilted to close to a vertical position. The shear force in powder 224 is caused by a chain-like linking of particles in powder 224. The shear force and torque by powder 224 depends on the amount of current in coil 220, and is independent of the seeds of outer drum 202 and inner rotor 204.

The advantages of steering device 100 and each of its identical clutches 150, 152 are indicated hereafter.

1. Clutch 150 avoids a poor distribution of portions of powder 224 in cylindrical cavity 218.

2. Clutch 150 avoids use of any internal area which would cause an unwanted collection of portions of powder 224.

3. Clutch 150 is operable at any angle in any device, such as a helicopter.

4. Clutch 150 during start-up evenly distributes powder 224 in cylindrical cavity 218 due to a component of centrifugal force thereon.

5. Clutch 150, which has lead-in passages or angles 242 and 244, and lead-in surfaces 233, 234, 235, 237 and 239, directs the powder 224 into gap or cavity 218, regardless of orientation.

6. Clutch 150 transmits predicatable output torques, regardless of clutch orientation and during orientation changes.

7. Clutch 150 and clutch 152 can operate successfully in helicopter subassembly 100, as subassembly 100 moves through angular displacements about three axes in quadrature.

8. Performance data of clutch 150 of torque versus current is more sensitive and reliable than such data of the prior art clutch.

While the invention has been described in its preferred embodiments, it is to be understood that the words which have been used are words of description rather that limitation and that changes may be made within the purview of the appended claims without departing from the true scope and spirit of the invention in its broader aspects.

The embodiments of an invention in which an exclusive property or right is claimed are defined as follows:

1. A magnetic particle clutch for use as a clutch or a brake comprising:
   an outer drum having an axis;
   an inner rotor coaxial with the outer drum;
   said inner rotor having a shaft along the axis and having a first end wall fixedly connected to the shaft and having of axially spaced bearings journaled on the shaft and having a rotor cylinder fixedly connected to the shaft and disposed axially between the pair of axially spaced bearings;
   said outer drum having a housing mounted on the axially spaced bearings and having a second end wall fixedly connected to the housing and having a coil unit supported within the housing and having slip rings mounted on a radially exterior surface of the housing with conductors connecting to the coil unit;
   said rotor cylinder having a radially outer surface and said housing having a radially inner surface;
   a cylindrical working cavity disposed between the rotor cylinder radially outer surface and the housing radially inner surface;
   a magnetic powder disposed within the cylindrical working cavity;
   said cylindrical working cavity having a first set of cavities forming a first powder guide at a first end thereof and having a second set of cavities forming an identical, opposite hand, second powder guide at a second, opposite end thereof, wherein said first set of cavities forming the first powder guide includes:
   a first conical cavity connecting to the cylindrical working cavity;
   a radial cavity connecting to the first conical cavity; and
   a second conical cavity connecting to the radial cavity.

2. A clutch according to claim 1, wherein said rotor cylinder has:
   a rotor conical outer cavity surface;
   a rotor vertical inner cavity surface;
   a rotor conical inner cavity surface;
   and wherein said housing has:
   a housing conical inner cavity surface facing the rotor conical outer cavity surface forming the conical cavity;
   a housing vertical outer cavity surface having a portion facing the rotor vertical inner cavity surface forming the radial cavity, said housing vertical outer cavity surface also having a portion facing the rotor conical inner cavity surface forming the inner cavity.

3. A clutch according to claim 1, wherein said housing includes:
   a housing inner cylindrical portion having a portion with the radially inner housing surface forming the cylindrical working cavity and having a portion supporting the coil unit;
   a housing intermediate cylindrical portion having a portion supporting the conductors; and
   a housing outer cylindrical portion having a potion supporting the slip rings,
   thereby providing ease of assembly and repair of the housing.

* * * * *